United States Patent [19]

Nixon, Jr.

[11] Patent Number: 4,502,702
[45] Date of Patent: Mar. 5, 1985

[54] SEGMENTED SEAL FOR ROTARY EQUIPMENT

[76] Inventor: Robert J. Nixon, Jr., 2112 - 22nd St., Rock Island, Ill. 61201

[21] Appl. No.: 618,904

[22] Filed: Jun. 8, 1984

[51] Int. Cl.³ .............................................. F16J 15/24
[52] U.S. Cl. .................................... 277/101; 277/128; 277/194
[58] Field of Search ............... 277/101, 126, 128, 192, 277/194, 199

[56] References Cited

U.S. PATENT DOCUMENTS

| | | | |
|---|---|---|---|
| 1,671,161 | 5/1928 | Perks | 277/128 |
| 2,071,914 | 2/1937 | Bentley | 277/192 |
| 2,937,037 | 5/1960 | Woolsey | 277/101 |
| 3,298,698 | 1/1967 | Condon | 277/101 |
| 3,603,618 | 9/1971 | Stratton | 277/101 |
| 3,612,550 | 10/1971 | Wilkinson | 277/101 |
| 3,664,691 | 5/1972 | Nakamura | 277/199 |

*Primary Examiner*—Robert I. Smith
*Attorney, Agent, or Firm*—Jeffrey J. Miller

[57] ABSTRACT

A seal assembly for effecting a seal between a stationary housing and a rotatable cylinder includes a plurality of arcuate segments radially disposed about the outer circumference of the cylinder. Each segment has an axial sealing surface defining a radius approximately equal to that of the rotatable cylinder and additionally has an end section for overlapping adjacent segments thus creating a gap and radial interface between the adjacent circumferentially disposed segments. The sealing assembly additionally comprises means for sealing the gaps formed by the adjacent overlapping segments, apparatus for tensioning the segments radially about the outside circumference of the cylinder and studs for removably attaching each segment to the housing while concurrently permitting radial displacement of each segment independently from its adjacent segments.

1 Claim, 9 Drawing Figures

U.S. Patent  Mar. 5, 1985  Sheet 1 of 3  4,502,702
Fig. 1
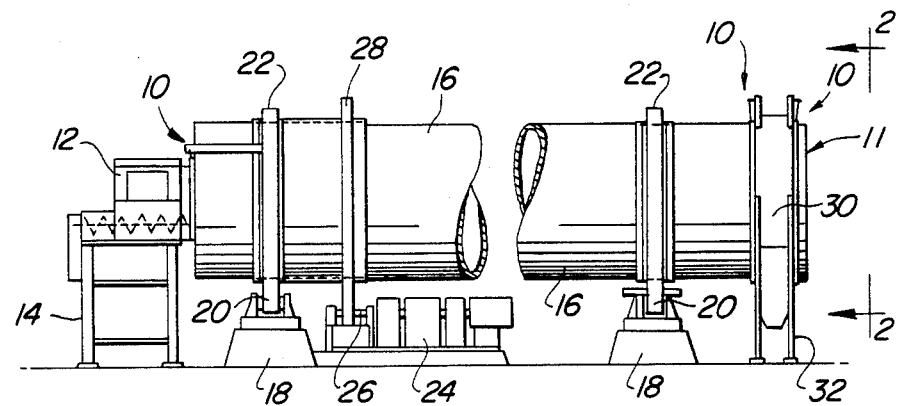
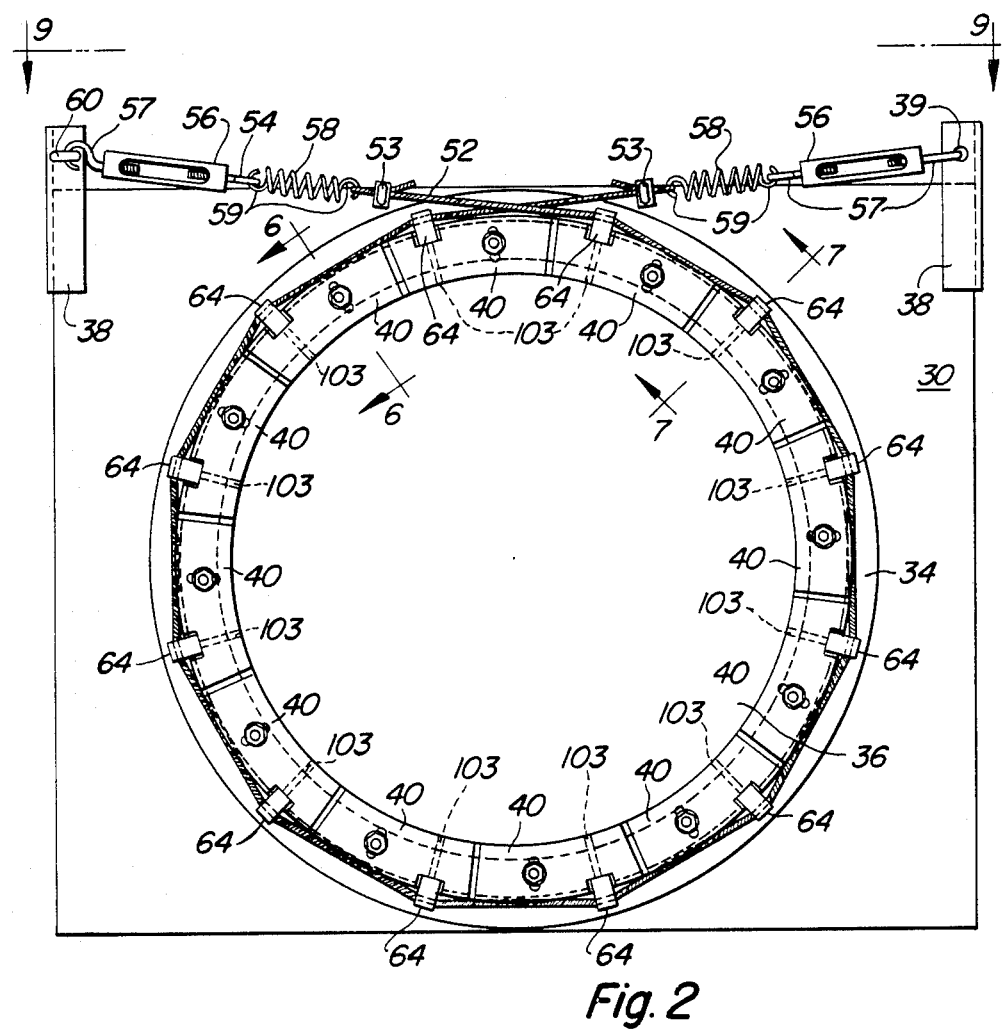
Fig. 2

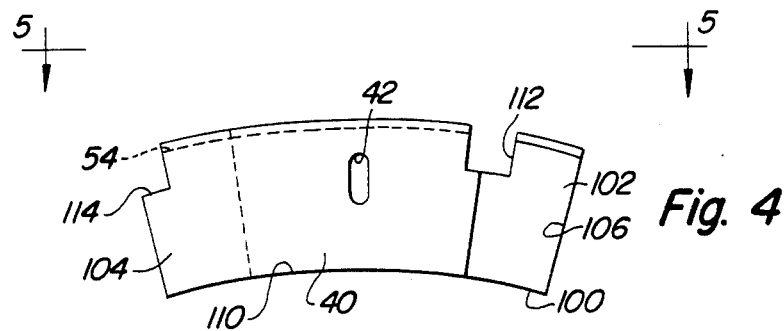
Fig. 4
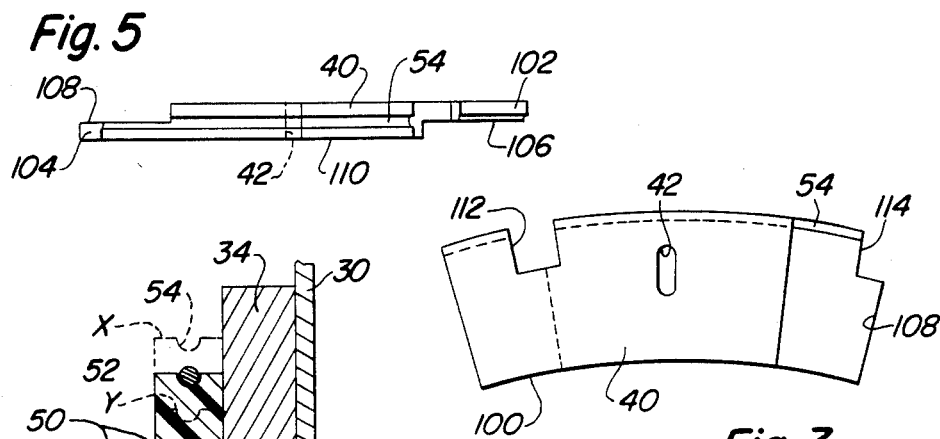
Fig. 5
Fig. 3
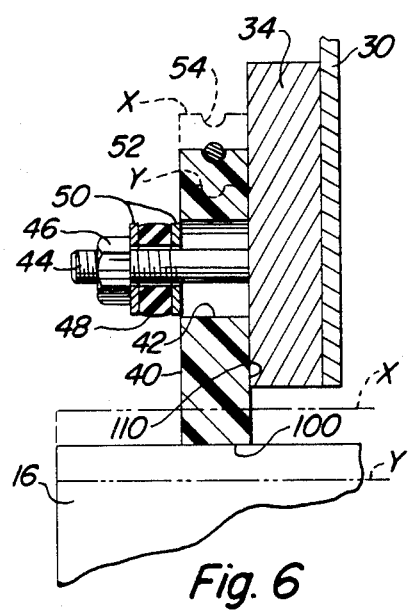
Fig. 6
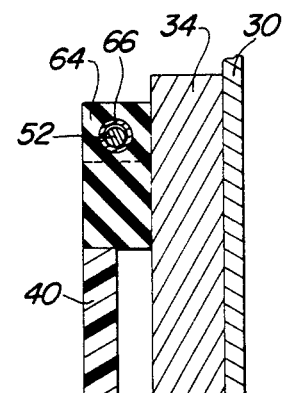
Fig. 7
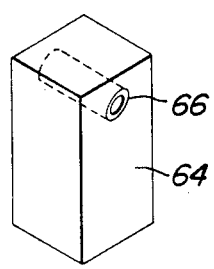
Fig. 8

SEGMENTED SEAL FOR ROTARY EQUIPMENT

BACKGROUND OF THE INVENTION

1. Field of the Invention

This invention relates generally to a seal assembly for sealing rotary equipment utilized primarily in the drying and cooling industry. More particularly, this invention pertains to a segmented seal for sealing the intake and discharge ends of steam tube and direct fire dryers and other types of rotary equipment including coolers which are commonly found in the grain processing and chemical industries.

2. Description of the Prior Art

The grain processing and chemical industries typically have a requirement for removing moisture from raw materials, by-products and finished products. For example, brewers generate vast quantities of "brewers spent grains" which are a high moisture, high protein by-product of the brewing process. This by-product is useful in the cattle feed industry so long as the water is removed prior to feeding livestock. Consequently, cost-effective techniques of removing the moisture from such spent grains has been devised utilizing rotary steam tube dryers. Such dryers are comprised of a rotating cylindrical body having tubes disposed longitudinally therein which are charged with steam to elevate the temperature of the contents of the dryer for removing moisture therefrom by evaporation. Alternatively, the contents of the dryer is heated by direct exposure to a flame. This type of dryer is referred to as a direct fire dryer.

Common to all types of rotary equipment utilized in the grain and chemical industry for drying or cooling is a stationary intake housing for receiving the product. The dried product exits the rotary equipment into a stationary discharge housing. Consequently, prior art means have been devised for sealing the stationary intake and discharge housings with respect to the rotating cylinder so that the product to be dried is not lost or the efficiency of the equipment is not impaired.

Moreover, a pressure gradient often develops from the inside of the equipment with respect to the outside atmosphere. These pressure gradients can be caused by velocity of the product within the equipment as well as by increases in the volume of heated, moisture laden discharge air. These pressure gradients exacerbate the problem of sealing the intake and discharge ends of the equipment as they can cause either undesirable loss of product through the seal, or alternatively result in excessive intake of air which reduces efficiency of the equipment.

Prior art seals are comprised of segmented articulated rings circumferentially disposed about the rotating cylinder and affixed to the stationary housing of rotary equipment. Said arrangement provides axial and radial sealing with respect to the rotating cylinder. However, this prior art apparatus becomes ineffective as the axial and radial sealing surfaces undergo wear. Moreover, although the prior art does allow for limited compensation for irregularities in the roundness of the rotating cylinder, such accommodation is reduced as the prior art apparatus wears with usage.

Additionally, where the rotary equipment relies upon exogenous heat for drying, said equipment undergoes substantial increases in dimension as its temperature becomes elevated. This thermal expansion results in the prior art seal having a maximal effectiveness in a limited temperature range while being less effective at temperatures outside of said range.

Therefore, it is desirable to provide a sealing assembly which accommodates wear along the axial sealing surface of the rotating cylinder as well as accommodates run-out due to irregularities in the roundness of the rotating cylinder's axial sealing surface. Furthermore, it is desirable to provide a seal assembly which operates at maximal efficiency at a wide range of operating temperatures and can accommodate concomitant wide ranging thermal expansion and contraction of the rotary equipment.

Finally, it is desirable to provide a seal assembly which minimizes the leakage of product or atmosphere at the axial and radial sealing surfaces where pressure gradients are likely to exist.

SUMMARY OF THE INVENTION

Therefore, it is provided in the practice of this invention according to a presently preferred embodiment a seal assembly for effecting a seal between a stationary housing and a rotatable cylinder comprising a plurality of arcuate segments radially disposed about the outer circumference of said cylinder. Each segment has an axial sealing surface defining a radius approximately equal to that of the rotatable cylinder and additionally has an end section for overlapping adjacent segments thus creating a gap and radial interface between said adjacent circumferentially disposed segments. The sealing assembly additionally comprises means for sealing the gaps formed by the adjacent overlapping segments, means for tensioning the segments radially about the outside circumference of the cylinder and means for removably attaching each segment to the housing while concurrently permitting radial displacement of each segment independently from its adjacent segments.

BRIEF DESCRIPTION OF THE DRAWINGS

These and other features and advantages of the present invention will be better understood by reference to the following description when considered in connection with the accompanying drawings where:

FIG. 1 is an elevational view of a rotary steam tube dryer illustrating three separate sealing assemblies each constructed according to the principals of this invention;

FIG. 2 is an elevational view of a typical seal assembly taken along line 2—2 of FIG. 1;

FIG. 3 is a frontal view of a typical seal segment;

FIG. 4 is a rear view of a typical seal segment;

FIG. 5 is a plan view taken along line 5—5 of FIG. 4;

FIG. 6 is an enlarged cross-sectional view taken along line 6—6 of FIG. 2;

FIG. 7 is an enlarged cross-sectional view taken along line 7—7 of FIG. 2;

FIG. 8 is an isometric view of an elastomeric sealing block; and

DESCRIPTION OF THE PREFERRED EMBODIMENTS

Figure 9:
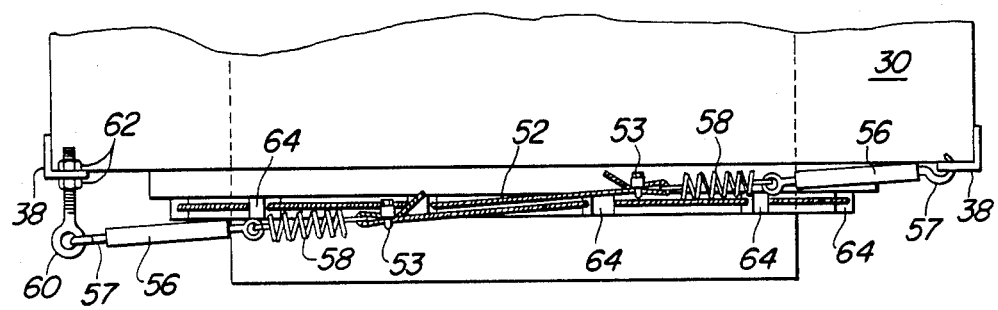
FIG. 9 is a plan view taken along line 9—9 of FIG. 2.

FIGS. 1, 2, 3, 4, 5, 6, 7, 8 and 9 illustrate a preferred embodiment of the seal assembly 10 constructed according to the principals of this invention. Three examples of the preferred embodiment 10 are shown utilized in conjunction with the typical rotary steam tube dryer 11. It is contemplated that other embodiments of this invention fall within its scope for applications utilized in direct fire dryers, coolers and all types of rotary equipment employed in the grain processing and chemical industries for removing moisture by evaporative process or alternatively removing heat by convection, conduction and radiation. Moreover, it is anticipated that embodiments of this invention could be adapted to rotary equipment utilized in other industries such as sewage treatment and cement manufacturing. These alternative industries also have an ongoing demand for rotary equipment and such equipment could be easily modified to incorporate the preferred embodiment of the seal assembly described and claimed herein.

FIG. 1 illustrates a rotary steam tube dryer 11 having an intake housing 12 which is supported in a stationary position by an intake housing stand 14. A rotatable cylindrical portion or shell 16 is interposed between the intake housing 12 and a discharge housing 30 which is stationarily supported by a discharge housing stand 32.

The shell 16 is rotatably supported by two pairs of rolls 20 each pair of which is in turn stationarily supported by roll bases 18. Each pair of rolls 20 are rotatably coupled to a tire 22 affixed to each end of the shell 16. The shell is driven by a motor 24 which is coupled by a pinion gear 26 to a ring gear 28 which is affixed to the outer circumference of the shell 16.

The equipment is utilized by continuously rotating the shell 16 by means of the motor 24, and by charging steam tubes (not shown) disposed within the interior of the shell 16. After the equipment has reached proper operating temperature, the product desired to be dried is caused to enter the intake housing 12 on a continuous basis. The product is rotated within the shell and passes through the shell at a predetermined velocity so that adequate drying time is provided.

The dried product then exits the shell 16 through openings (not shown) in the shell which openings are covered by the stationary discharge housing 30. The product is then conveniently collected from the discharge housing 30 for further processing.

As moisture is removed from the product by evaporation due to contact with the hot steam tubes and other heated surfaces, the volume of gases within the shell 16 increases causing a pressure gradient with respect to the outside atmosphere. Gravity as well as the pressure gradient from the inside to the outside of the shell would cause material to be lost at the margin between the rotating shell 16 and the stationary discharge housing 30 if such circumferential margin were not properly sealed. The seal disposed at the discharge housing 30 requires two separate seal assemblies 10, one distal and one proximal to the discharge end of the shell.

Additionally, a seal assembly 10 is required between the intake housing 12 and the intake end of the shell 16. This seal assembly functions to prevent waste and spillage of the product through the gap between the intake housing 12 and the intake end of the shell 16. Said loss is occasioned by gravitational forces and pressure gradients that may develop at the intake end of the shell.

FIG. 2 illustrates an example of the preferred embodiment of the seal assembly 10 constructed according to the principles of this invention. Said illustrated seal assembly 10 is the assembly proximal to the discharge end of the shell 16. However, the discharge housing 30 seal 10 distal to the discharge end of the shell 16 is identical in construction to that illustrated. Moreover, the seal assembly 10 disposed at the intake end of the shell 16 is also identical in construction to that illustrated in FIG. 2.

A plurality of arcuate segments 40 are circumferentially disposed about the outside circumference of the shell 16 by affixing them to a seal mounting ring 34. Said mounting ring 34 is preferably welded to its associated discharge 30 or intake 12 housing. Alternatively, said mounting ring 34 may be bolted or otherwise removably affixed to its appropriate housing to permit proper installation and periodic adjustment if required. Said ring 34 and said housings 30 and 12, respectively are preferably constructed from ferrous materials to facilitate ordinary arc welding and the like.

The segments 40 are constructed from nonferrous material such as epoxy impregnated cloth or fiberglass. Sythane-Taylor (Philadelphia) Synthane TM is preferably utilized. Alternatively brass, bronze, Teflon, plastic or other bearing material may also be utilized. Each arcuate segment 40 is mounted to the seal mounting ring 34 by means of a stud 44 which is fixidly attached to said mounting ring 34. Said attachment is accomplished by welding to or by threaded coupling with the mounting ring 34. Each stud 44 passes through an elongated stud slot 42 defined by each seal segment 40. A donut shaped elastomeric bushing 48, having a steel washer disposed on either side of said bushing 48, is interposed between said seal segment 40 and a nut 46. Said nut 46 cooperatively engages the threads of the stud 44 and is adjusted with sufficient torque such that adequate pressure is developed within the elastomeric bushing 48 with a component coaxial to the stud 44. Said coaxial pressure provides adequate force to maintain a radial seal between the radial seal surface 110 of the segment 40 and the seal mounting ring 34.

Elastomers as used herein include materials preferably selected from the group consisting of styrene-butadiene rubbers, natural rubbers, cis-polybutadiene rubbers, cis-polyisoprene rubbers, ethylene-propylene rubbers, butyl rubbers, polyacrylates, polysulfide rubbers, silicones, fluorocarbons, neoprene, nitrile rubbers, polyurethanes and other elastomers.

The elongated slot 42 defined by the segment 40 is aligned radially with respect to the arcuate axial seating surface 100 of the segment 40. The radius of the axial seating surface 100 is selected to be approximately equal to that of the shell 16 and thus said arcuate axial seating surface 100 comprises a portion of the total axial seal of the seal assembly 10. The length of the slot 42 is selected to allow sufficient radial displacement of the segment 40 to accommodate anticipated or measured irregularities in the roundness of the shell 16 as well as to accommodate wear to the seal segments 40 along their axial seating surfaces 100. FIG. 6 illustrates with reference characters "X" and "Y" the relative range of travel of an out of round or "egg shaped" shell 16 that can be accommodated by corresponding radial displacements of the seal segment 40 and associated slot 42.

Each segment 40 additionally defines a first overlap section 102 and a second overlapping section 104. Said sections preferably have a thickness of approximately one-half the thickness of the segment 40 in the vicinity of the slot 42. The first and second overlap sections 102 and 104, respectively, are designed to overlap the second and first sections 104 and 102, respectively, of adjacent segments 40. The width of said sections 102 and 104 is also selected to accommodate wear of the arcuate axial seating surface 100 which results in gradual inward radial displacement of the segments.

Said first and second overlap sections 102 and 104, respectively, additionally define first and second radial lap sealing surfaces 106 and 108, respectively, which contact second and first radial lap sealing surfaces 108 and 106 respectively, of adjacent segments 40. Said lap sealing surfaces 106 and 108 comprise an integral part of the radial seal provided by the seal assembly 10.

First and second seal block seats 112 and 114, respectively, having a square or rectangular cross section in the plane of the segment 40 are defined within each seal segment 40 along its outer radius. The location of said first and second seats 112 and 114, respectively, is selected to align with the gaps 103 formed by adjacent first and second overlap sections 102 and 104, respectively, of adjacent segments 40. Disposed within each complete seal block seat formed by the combination of adjacent segments 40 and associated adjacent first and second seal block seats 112 and 114, respectively, is an elastomeric seal block 64.

Said seal block 64 is selected to have a thickness less than or equal to the thickness of the segment 40 in the vicinity of the slot 42. The width of the block 64 selected to provide adequate sealing at the point of the gap 103 formed by the adjacent segments 40. The width is also selected to not interfere with the radial displacement of the segments 40 throughout their entire range permitted by the length of the elongated slot 42. Said width is also selected to accommodate wear along the arcuate axial seating surface 100 of the segments 40 permitting their gradual radial displacement inwardly toward the longitudinal axis of the shell 16.

A cable alignment groove 54 is defined by each arcuate segment 40 along its outer circumference for aligning a cable 52 each end of which is attached to an associated anchor bracket 38 through an associated turn buckle 56 and spring 58.

Said anchor brackets 38 are preferably comprised of ferrous metal and attached in the vicinity of each of the upper corners of the associated intake 12 or discharge 30 housing by arc welding or other means. One end of the cable 52 is coupled to one of the anchors 38 through a spring 58 and turnbuckle 56. Said turnbuckle 56 has hooks disposed at each end, one passing through an anchor hole 39 defined by its associated bracket 38 and the other passing through a hook 59 formed by one end of the spring 58. The other end of the spring 58 defines a second hook 59 which passes through a loop in the end of the cable 52 which is formed by a clamp 53.

The other end of the cable 52 is similarly anchored to the second anchor bracket 38 with the addition of an eyebolt 60 through which one hook 57 of the turnbuckle passes. Said eyebolt 60 has a threaded portion which passes through an anchor hole 39 defined by the bracket 38. Disposed on either side of the bracket is a nut 62 for removably attaching said eyebolt to said bracket 38. This arrangement allows the distance between the opening defined by the eyebolt 60 the bracket to be adjusted. Said adjustment ensures that the cable 52 does not contact itself at the point where it crosses itself.

A feature of the preferred embodiment provides that the cable 52 almost completely surrounds the entire seal assembly without rubbing against itself at the point of cross over. The cable 52 is threaded through a cylindrical sleeve 66 passing through each seal block 64. The tension 58 created by the springs 58 and the cable 52 creates a radial component along the circumference of the seal assembly 10 which is transmitted to said seal assembly through the seal block 64. The cable tension created by the springs 58 is adjusted by appropriate adjustment of the turnbuckles 56.

Said cable tension has a two-fold purpose. First, it serves to ensure that each segment 40 has an adequate radial force factor to ensure that said segment 40 is properly seated against the axial seating surface of the shell 16. Second, said radial force ensures that each gap 103 is properly sealed by its associated sealing block 64 to perfect a complete axial seal.

The described embodiments of the invention are only considered to be preferred and illustrative of the inventive concept. The scope of the invention is not restricted to such embodiments. Various and numerous other arrangements may be devised by one skilled in the art without departing from the spirit or scope of this invention. For example, it is contemplated that the elastomeric bushing 48 disclosed herein could be substituted with a spring or the like to provide adequate force to perfect the desired radial seal.

Moreover, means for tensioning the cable 52 could alternatively comprise weights coupled to the ends of the cable by means of pulleys. Additionally, the number of segments to be employed can vary depending upon the outside dimension of the shell. For instance, larger shells would require a greater number of segments than smaller ones. Where small deviations in the roundness of the shell 16 are expected, however, fewer arcuate segments having a concomitantly longer cord length may be utilized as anticipated displacement of the segments is reduced.

Finally, where additional seal capability is required, the axial and radial sealing surfaces can be greased. Such application of lubricant further enhances the seal's ability to withstand pressure gradients as well as lubricates the axial and radial surfaces which are subject to wear.

I claim:

1. A sealing assembly for effecting a seal between a stationary housing and a rotatable cylinder comprising:
   a plurality of arcuate segments radially disposed about the outer circumference of the cylinder each having
      an axial sealing surface defining a radius approximately equal to that of the rotatable cylinder; and
      end sections for overlapping adjacent circumferentially disposed segments creating a gap and radial interface between said adjacent segments;
   means for sealing the gaps formed by the adjacent overlapping segments;
   means for tensioning the segments radially about the outside circumference of the cylinder; and
   means for removably attaching each segment to said housing while concurrently permitting radial displacement of each segment independently from its adjacent segments.

* * * * *

UNITED STATES PATENT AND TRADEMARK OFFICE
CERTIFICATE OF CORRECTION

PATENT NO. : 4,502,702

DATED : March 5, 1985

INVENTOR(S) : Robert J. Nixon, Jr.

It is certified that error appears in the above-identified patent and that said Letters Patent are hereby corrected as shown below:

column 1, line 30, the word "is" should be deleted and substituted therefor the term --are--.

column 2, line 46, the word "principals" should be deleted and substituted therefor the term --principles--.

column 3, line 22, the word "are" should be deleted and substituted therefor the term --is--.

column 4, line 24, the word "donut" should be deleted and substituted therefor the term --doughnut--.

column 4, line 43, the word "seating" should be deleted and substituted therefor the term --sealing--.

column 4, line 45, the word "seating" should be deleted and substituted therefor the term --sealing--.

column 4, line 46, the word "seating" should be deleted and substituted therefor the term --sealing--.

UNITED STATES PATENT AND TRADEMARK OFFICE
CERTIFICATE OF CORRECTION

PATENT NO. : 4,502,702

DATED : March 5, 1985

INVENTOR(S) : Robert J. Nixon, Jr.

It is certified that error appears in the above-identified patent and that said Letters Patent are hereby corrected as shown below:

column 4, line 52, the word "seating" should be deleted and substituted therefor the term --sealing--.

column 4, line 67, the word "seating" should be deleted and substituted therefor the term --sealing--.

column 5, line 29, the word "seating" should be deleted and substituted therefor the term --sealing--.

column 6, line 11, the word "seating" should be deleted and substituted therefor the term --sealing--.

Signed and Sealed this

Twenty-fourth Day of September 1985

[SEAL]

Attest:

Attesting Officer

DONALD J. QUIGG

Commissioner of Patents and Trademarks—Designate